US009315166B2

(12) United States Patent
Nie et al.

(10) Patent No.: US 9,315,166 B2
(45) Date of Patent: Apr. 19, 2016

(54) TECHNIQUES FOR SYNCHRONOUS RECTIFICATION CONTROL OF DC-DC CONVERTERS IN ELECTRIFIED VEHICLES

(71) Applicants: Zhong Nie, Troy, MI (US); Mengyang Zhang, Troy, MI (US); Dennis Krozek, Novi, MI (US); Fred A Householder, Shelby Township, MI (US); Hua Bai, Flint, MI (US); Wei Guo, Novi, MI (US); Chen Duan, Northville, MI (US)

(72) Inventors: Zhong Nie, Troy, MI (US); Mengyang Zhang, Troy, MI (US); Dennis Krozek, Novi, MI (US); Fred A Householder, Shelby Township, MI (US); Hua Bai, Flint, MI (US); Wei Guo, Novi, MI (US); Chen Duan, Northville, MI (US)

(73) Assignees: FCA US LLC, Auburn Hills, MI (US); Kettering University, Flint, MI (US)

( * ) Notice: Subject to any disclaimer, the term of this patent is extended or adjusted under 35 U.S.C. 154(b) by 0 days.

(21) Appl. No.: 14/323,563

(22) Filed: Jul. 3, 2014

(65) Prior Publication Data
US 2015/0019055 A1 Jan. 15, 2015

Related U.S. Application Data

(60) Provisional application No. 61/845,637, filed on Jul. 12, 2013.

(51) Int. Cl.
*B60L 9/00* (2006.01)
*B60R 16/03* (2006.01)
(Continued)

(52) U.S. Cl.
CPC . *B60R 16/03* (2013.01); *B60L 1/00* (2013.01); *B60L 11/08* (2013.01); *B60L 11/1803* (2013.01); *B60L 11/1868* (2013.01); *H02M 3/33592* (2013.01); *B60L 2210/12* (2013.01); *B60L 2240/526* (2013.01); *B60L 2240/527* (2013.01); *B60L 2240/529* (2013.01);
(Continued)

(58) Field of Classification Search
CPC . H02M 3/3376; H02M 3/00; H02M 3/33569; H02M 3/335; H02M 3/24; H02J 7/0054; H02J 1/02
USPC .......... 701/22; 180/65.265; 323/282; 363/15, 363/65
See application file for complete search history.

(56) References Cited

U.S. PATENT DOCUMENTS 5,491,388 A * 2/1996 Nobuyuki et al. ............ 315/308
6,069,804 A 5/2000 Ingman et al.
(Continued)

OTHER PUBLICATIONS

Internatinal Search Report and Written Opinion dated Jan. 30, 2015 for International Application No. PCT/US2014/045849, International Filing Date Jul. 9, 2014.
(Continued)

*Primary Examiner* — Gertrude Arthur Jeanglaude
(74) *Attorney, Agent, or Firm* — Ralph E Smith

(57) ABSTRACT

Techniques are presented for synchronous rectification control (SRC) of a DC-DC converter in an electrified vehicle (EV) can include determining a required output current for the DC-DC converter based on a secondary voltage of a secondary battery system of the EV, the DC-DC converter being configured to convert a primary voltage from a primary battery system of the EV to the secondary voltage. The techniques can include determining, at the controller, a switching frequency for the DC-DC converter that causes the DC-DC converter to output the required output current. The techniques can include determining turn-on and turn-off delays of the DC-DC converter based on the required output current and the switching frequency using one or more look-up tables. The techniques can also include controlling the DC-DC converter efficiency based on the turn-on and turn-off delays.

20 Claims, 5 Drawing Sheets

(51) Int. Cl.
  B60L 11/18      (2006.01)
  H02M 3/335     (2006.01)
  B60L 1/00       (2006.01)
  B60L 11/08      (2006.01)
  H02J 7/00       (2006.01)
  H02J 1/00       (2006.01)
  H02M 3/337     (2006.01)
  H02M 1/00      (2007.01)

(52) U.S. Cl.
  CPC ........... *B60L 2250/16* (2013.01); *H02J 7/0054* (2013.01); *H02J 2001/002* (2013.01); *H02M 3/3376* (2013.01); *H02M 2001/0048* (2013.01)

(56) References Cited

U.S. PATENT DOCUMENTS

| | | | |
|---|---|---|---|
| 6,330,169 B2 * | 12/2001 | Mullett et al. | 363/16 |
| 6,809,678 B2 | 10/2004 | Vera et al. | |
| 2003/0142513 A1 * | 7/2003 | Vinciarelli | 363/17 |
| 2006/0152204 A1 | 7/2006 | Maksimovic et al. | |
| 2008/0137379 A1 | 6/2008 | Mao | |
| 2011/0211370 A1 | 9/2011 | Luo et al. | |
| 2012/0120683 A1 | 5/2012 | Hua et al. | |
| 2013/0169212 A1 | 7/2013 | Sun et al. | |

OTHER PUBLICATIONS

Fu, D. et al., "1MHz High Efficiency LLC Resonant Converters with Synchronous Rectifier," Institute of Electrical and Electronics Engineers (IEEE), 2007, pp. 2404-2410.

Kats, A. et al., "Application of Integrated Magnetics in Resonant Converters," Power Electronics Laboratory, Department of Electrical and Computer Engineering, Ben-Gurion University of the Negev Israel, 1997 pp. 1-6.

Kim, B. et al., "LLC Resonant Converter With Adaptive Link-Voltage Variation for a High-Power-Density Adapter," IEEE Transactions on Power Electronics, vol. 25, No. 9, Sep. 2010, pp. 2248-2252.

Lazar, J. et al., "Steady-State Analysis of the LLC Series Resonant Converter," Institute of Electrical and Electronics Engineers (IEEE), 2001, pp. 728-735.

Park, K. et al., "Analysis and Design of LLC Resonant Converter Considering Rectifier Voltage Oscillation," Institute of Electrical and Electronics Engineers (IEEE), 2009, pp. 771-775.

Yang, B. et al., "LLC Resonant Converter for Front End DC/DC Conversion," Institute of Electrical and Electronics Engineers (IEEE), 2002, pp. 1108-1112.

Zhang, J. et al., "A Current-Driving Synchronous Rectifier for an LLC Resonant Converter With Voltage-Doubler Rectifier Structure," IEEE Transactions on Power Electronics, vol. 27, No. 4, Apr. 2012, pp. 1894-1904.

Zhang, M., "Electrical, Thermal, and EMI Designs of High-Density, Low-Profile Power Supplies," Dissertation submitted to the Faculty of the Virginia Polytechnic Institute and State University, Blacksbrug, Virginia, Feb. 17, 1997, 213 pages.

* cited by examiner

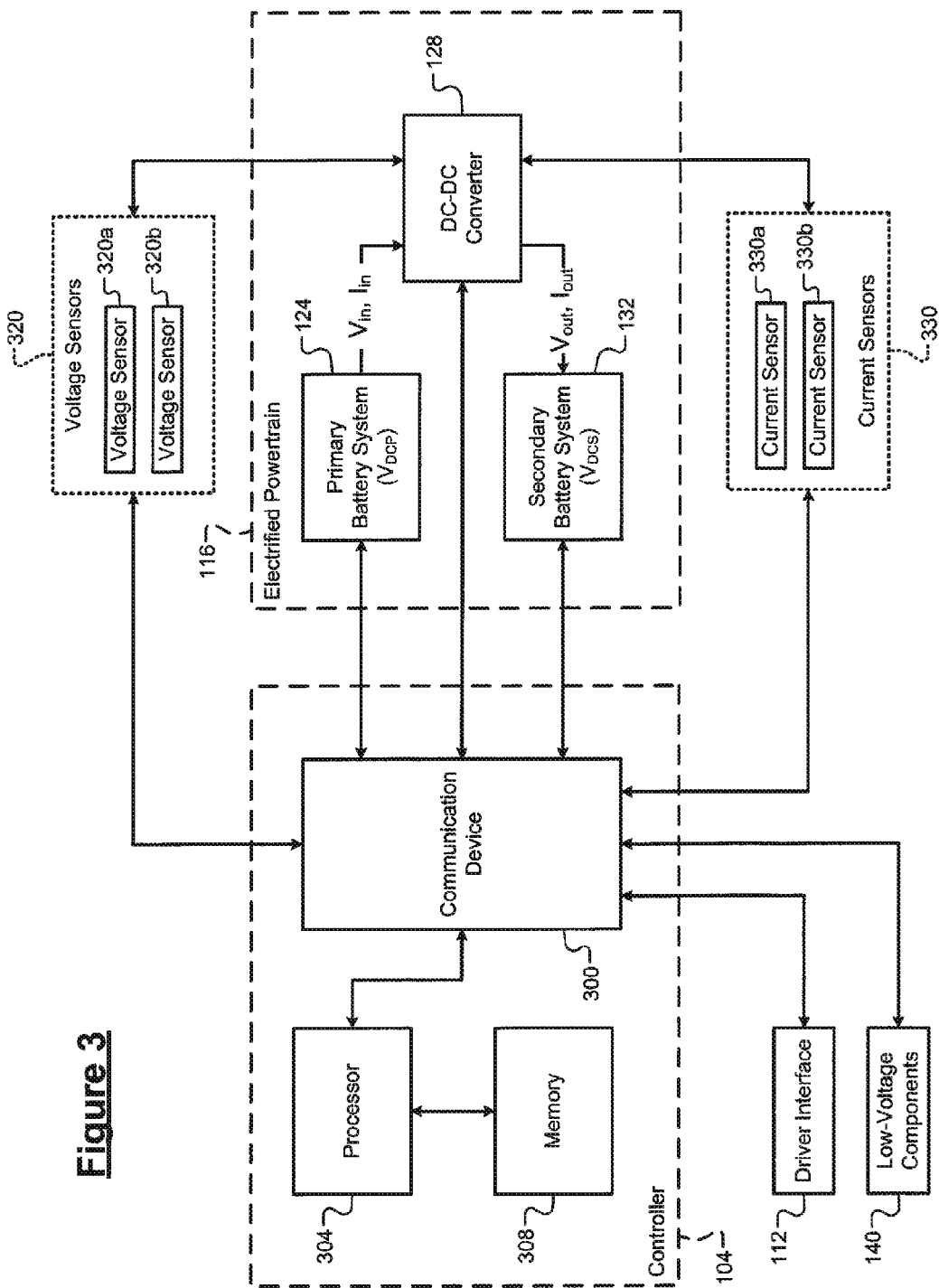

TECHNIQUES FOR SYNCHRONOUS RECTIFICATION CONTROL OF DC-DC CONVERTERS IN ELECTRIFIED VEHICLES

RELATED APPLICATIONS

This application claims the benefit of U.S. Provisional Ser. No. 61/845,637, filed Jul. 12, 2013.

FIELD

The present disclosure relates generally to electrified vehicles and, more particularly, to techniques for synchronous rectification control of DC-DC converters in electrified vehicles.

BACKGROUND

An electrified vehicle (EV) is a vehicle that can be propelled using electric power, i.e., an electric current. Examples of EVs include hybrid electric vehicles (HEVs), plug-in HEVs (PHEVs), fuel cell electric vehicles (FCEVs), and battery electric vehicles (BEVs). The EV can include a primary battery system comprising one or more batteries and can output a direct current (DC) voltage that can be used to rotatably drive an electric motor to generate drive torque for propelling the EV. For example, the DC voltage may be converted to three-phase alternating current (AC) voltages by a three-phase inverter, and the three-phase AC voltages can be used to rotatably drive a three-phase electric motor. The EV can also include a secondary battery system, e.g., a 12V lead-acid battery, which can be used to power low-voltage components of the EV.

SUMMARY

In one form, a method is provided in accordance with the teachings of the present disclosure. The method can include determining, at a controller of an electrified vehicle (EV), the controller including one or more processors, a required output current for a DC-DC converter based on a secondary voltage of a secondary battery system of the EV, the DC-DC converter being configured to convert a primary voltage from a primary battery system of the EV to the secondary voltage. The method can include determining, at the controller, a switching frequency for the DC-DC converter that causes the DC-DC converter to output the required output current. The method can include determining, at the controller, turn-on and turn-off delays of the DC-DC converter based on the required output current and the switching frequency using one or more look-up tables. The method can also include controlling, by the controller, the DC-DC converter based on the turn-on and turn-off delays.

In another form, a method is provided in accordance with the teachings of the present disclosure. The method can include determining, at a controller of an EV, the controller including one or more processors, a required output current for a DC-DC converter based on a secondary voltage of a secondary battery system of the EV, the DC-DC converter being configured to convert a primary voltage from a primary battery system of the EV to the secondary voltage for at least one of recharging the secondary battery system of the EV and powering low-voltage components of the EV. The method can include determining, at the controller, a switching frequency for the DC-DC converter that causes the DC-DC converter to output the required output current. The method can include determining, at the controller, turn-on and turn-off delays of the DC-DC converter based on the required output current and the switching frequency using one or more look-up tables. The method can include controlling, by the controller, the DC-DC converter based on the turn-on and turn-off delays. The method can include determining, at the controller, input current, output current, input voltage, and output voltage of the DC-DC converter. The method can include determining, at the controller, an efficiency of the DC-DC converter based on the input current, the output current, the input voltage, and the output voltage of the DC-DC converter. The method can include comparing, at the controller, the efficiency of the DC-DC converter to a maximum efficiency of the DC-DC converter. The method can also include selectively adjusting, at the controller, at least one of the turn-on and turn-off delays of the DC-DC converter based on the comparison to obtain at least one of a modified turn-on delay and a modified turn-off delay.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a functional block diagram of a controller of the EV according to the principles of the present disclosure;

DESCRIPTION

Figure 1:
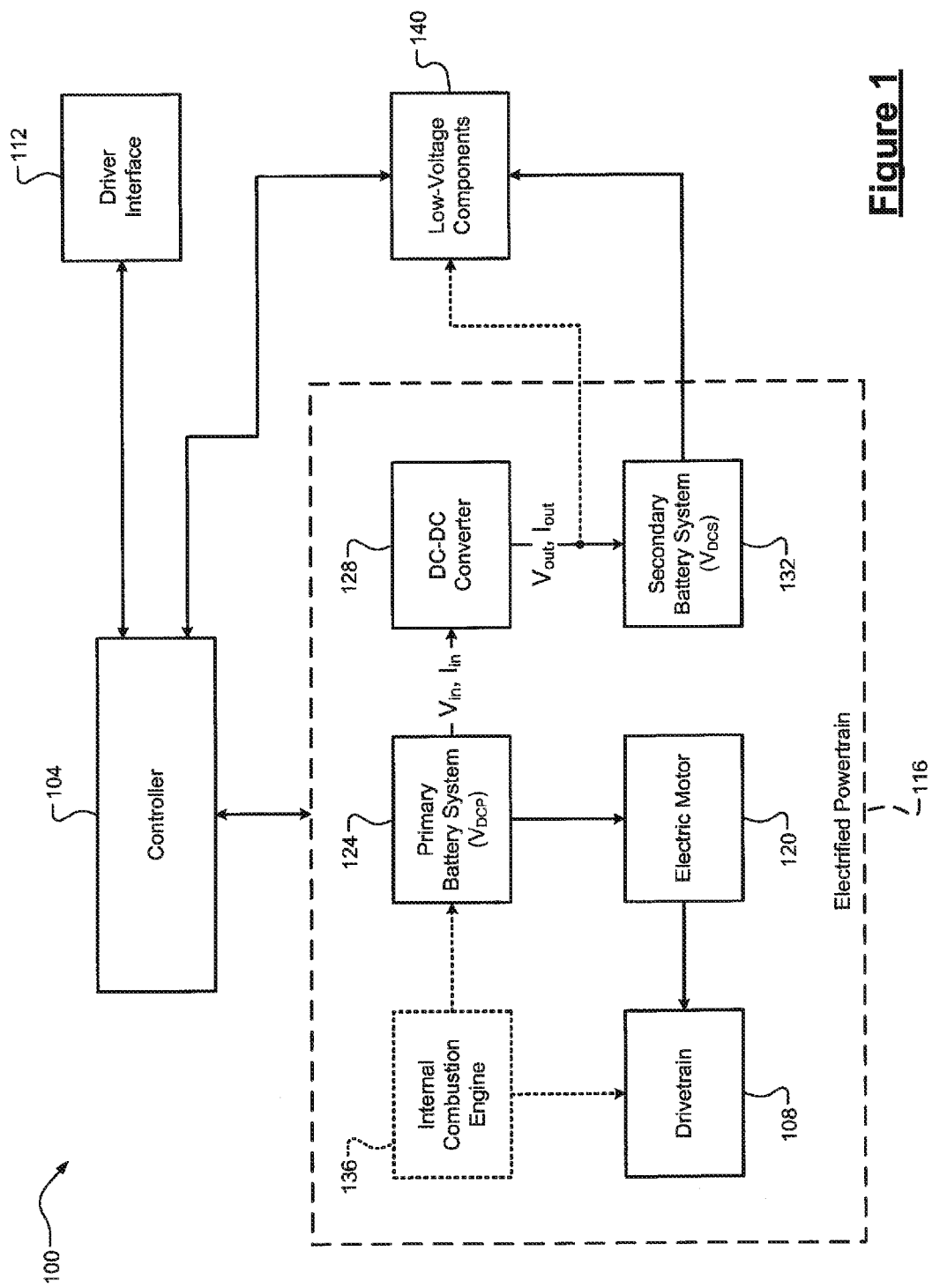
FIG. 1 is a functional block diagram of an electrified vehicle (EV) according to the principles of the present disclosure.

As mentioned above, an electrified vehicle (EV) can include a battery system that outputs a direct current (DC) voltage. This battery system can be referred to as a primary battery system because it can be used to power an electric motor to propel the EV. For example only, the primary battery system can be a battery pack including a plurality of lithium-ion (Li-ion) batteries having a collective voltage of 220-440V. The EV can also include a secondary battery system that comprises one or more batteries. For example only, the secondary battery system may be a single 12V lead-acid battery. The secondary battery system can be used to power low-voltage components of the EV (headlights, power steering pump, air conditioner, gauges/displays, radio, navigation/GPS, etc.).

The secondary battery system is typically recharged by an alternator that converts mechanical energy from an internal combustion engine to electrical energy. The alternator can also be used to directly power low-voltage components of the EV. In the case of an EV without an alternator, however, the secondary battery system may be recharged by the primary battery system. A DC-DC converter can be implemented to convert the high-voltage output of the primary battery system, e.g., 220V-440V, to a lower voltage for recharging the secondary battery system, e.g., 6.5V-16V. The lower voltage output by the DC-DC converter can also be used to directly power low-voltage components of the EV.

Accordingly, techniques are presented for synchronous rectification control (SRC) of DC-DC converters in EVs. The techniques provide for software-based SRC, which can both eliminate SRC hardware and be easily adapted to any application, thereby decreasing costs and complexity. These techniques can also be referred to as triggering angle tracking SRC, or (TARSRC). The techniques can include determining a required output current for a DC-DC converter based on a secondary voltage of a secondary battery system of an EV, the DC-DC converter being configured to convert a primary voltage from a primary battery system of the EV to the secondary voltage. The techniques can include determining, at the controller, a switching frequency for the DC-DC converter that causes the DC-DC converter to output the required output current.

The techniques can include determining turn-on and turn-off delays between primary and secondary switches of the DC-DC converter based on the required output current and the switching frequency using one or more look-up tables. The techniques can also include controlling the DC-DC converter based on the turn-on and turn-off delays. In some implementations, the techniques can further include measuring input/output voltages and currents of the DC-DC converter and calculating an efficiency of the DC-DC converter based on the measurements. The techniques can then adjust the turn-on and/or turn-off delays for controlling the DC-DC converter based on the efficiency. This process may be repeated until a maximum efficiency of the DC-DC converter is achieved. While the techniques of the present disclosure are described with respect to DC-DC converters for EVs, it should be appreciated that these techniques can be applied to any DC-DC converters.

Referring now to FIG. 1, a functional block diagram of an EV 100 is illustrated. The EV 100 can include a controller 104, a drivetrain 108, a driver interface 112, and an electrified powertrain 116. As shown, the drivetrain 108 can be part of the electrified powertrain 116. Based on driver input via the driver interface 112, the controller 104 can determine a torque request. The controller 104 can then control the electrified powertrain 116 based on the torque request such that the electrified powertrain 116 outputs a desired drive torque to the drivetrain 108. The drivetrain 108 can include any suitable components for propelling the EV 100 (a transmission, a torque converter, four wheels, etc.). It should be appreciated that the components of the drivetrain 108 and the electrified powertrain 116 can be grouped in various different manners. The driver interface 112 can include any suitable components for interacting with a driver of the EV 100 (an accelerator pedal, gauges/displays, etc.).

The electrified powertrain 116 can include an electric motor 120, a primary battery system 124, a DC-DC converter 128, and a secondary battery system 132. The primary battery system 124 can be any suitable battery system configured to output a primary DC voltage ($V_{DCP}$) for powering the electric motor 120 to propel the EV 100. The primary battery system 124 may be a Li-ion battery pack that includes a plurality of Li-ion battery cells, but it should be appreciated that the primary battery system 124 can have other suitable configurations. The primary DC voltage $V_{DCP}$ output by the primary battery system 124 may be within the range from 220-400V, but it should be appreciated that the primary DC voltage $V_{DCP}$ may have other suitable voltage magnitudes.

The electrified powertrain 116 can also include other suitable components, such as a three-phase inverter (not shown) for converting the primary DC voltage $V_{DCP}$ to three-phase AC voltages for the electric motor 120. In some implementations, the EV 100 can further include an internal combustion engine 136. The internal combustion engine 136 may be configured to generate drive torque for the drivetrain 108, e.g., based on the torque request and thus may be part of the electrified powertrain 116. While the EV 100 may include the internal combustion engine 136, the EV 100 does not include an alternator because the internal combustion engine 136 would not be running at all times and thus the alternator would not operate as desired.

The DC-DC converter 128 can convert an input voltage $V_{in}$, the primary DC voltage $V_{DCP}$, to a lower output voltage $V_{out}$. The output voltage $V_{out}$ can be used to recharge the secondary battery system 132, and/or to directly power low-voltage components 140 of the EV 100. The output voltage $V_{out}$ may be in the range from 6.5-16V, but it should be appreciated that the output voltage $V_{out}$ may have other suitable voltage magnitudes. The secondary battery system 132 may be a lead-acid battery having a secondary voltage $V_{DCS}$ of approximately 12V, e.g., 6.5-16V, but it should be appreciated that other types and/or voltage-rated batteries could be implemented. In one implementation, for example only, the DC-DC converter 128 may be a 2.5 kilowatt (kW) 400V-13.8V DC-DC converter.

The low-voltage components 140, for example only, can include headlights, a power steering pump, and/or an air conditioner. The low-voltage components 140 can also include other suitable components, such as gauges/displays of the driver interface 112 and/or the controller 104 itself. The secondary battery system 132 can also be used to power the low-voltage components 140 of the EV 100. The controller 104 can perform SRC of the DC-DC converter 128 according to the techniques of the present disclosure, which are described in more detail below.

Figure 2A:
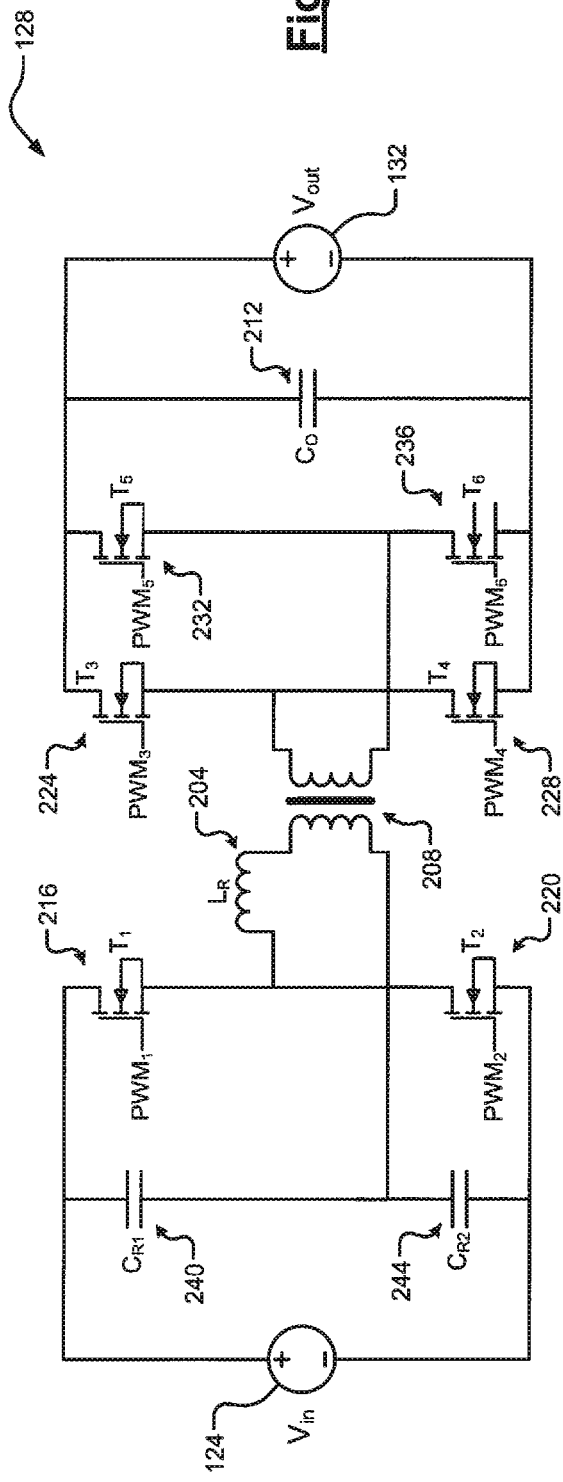
FIG. 2A is a circuit diagram of a DC-DC converter of the EV according to the principles of the present disclosure.

Referring now to FIG. 2A, an exemplary circuit diagram for the DC-DC converter 128 is shown. This configuration of the DC-DC converter 128 can also be referred to as an inductor-inductor-capacitor (LLC) half-bridge configuration. While an LLC half-bridge configuration is illustrated, it should be appreciated that the DC-DC converter 128 can have any other configuration suitable for SRC or, more particularly, TATSRC. The DC-DC converter 128 can include a resonant inductor $L_R$ 204, a transformer 208, and a capacitor $C_O$ 212. The DC-DC converter 128 can also include six transistors $T_1$ 216, $T_2$ 220, $T_3$ 224, $T_4$ 228, $T_5$ 232, and $T_6$ 236 and two other capacitors $C_{R1}$ 240 and $C_{R2}$ 244. For example, transistors $T_1$-$T_6$ can be metal-oxide-semiconductor field-effect transistors (MOSFETs).

Figure 2B:
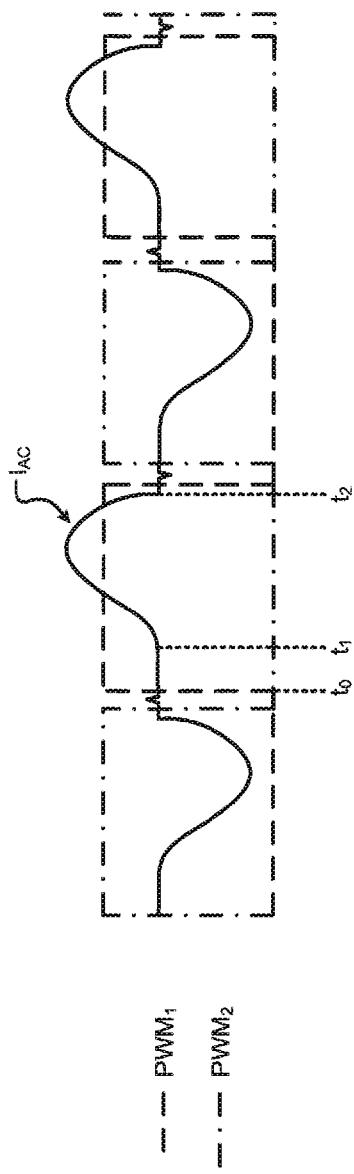
FIG. 2B is a timing diagram of the DC-DC converter of FIG. 2A according to the principles of the present disclosure.

The transistors $T_1$-$T_6$ are controlled by pulse-width modulated (PWM) gate drive signals $PWM_1$-$PWM_6$, respectively. These gate drive signals may be generated by the controller 104 or another suitable gate driver. $PWM_1$ and $PWM_2$ represent complimentary gate drive signals. FIG. 2B illustrates triggering time monitoring of the DC-DC converter 128. Time $t_0$ represents when gate drive signal $PWM_1$ turns on transistor $T_1$. Time $t_1$ represents the point where an AC current at the secondary rectification bridge through the transformer 208 of the DC-DC converter 128 (hereinafter "$I_{AC}$") begins to increase. Therefore, transistors $T_3$ and $T_6$ can be turned on at time $t_1$ to dramatically decrease conduction losses of the secondary side of the DC-DC converter 128. The difference between time $t_1$ and time $t_0$ ($t_1-t_0$) represents the "turn-on delay" of the DC-DC converter 128.

Time $t_2$, on the other hand, represents the point where the current $I_{DCS}$ at the secondary side of the DC-DC converter 128 drops to zero. Therefore, transistors $T_3$ and $T_6$ can be turned off at time $t_2$ to achieve SRC and thus increased efficiency of the DC-DC converter 128. The difference between time $t_2$ and time $t_0$ ($t_2-t_0$) represents the "turn-off delay" of the DC-DC converter 128. Gate drive signals $PWM_3$ and $PWM_6$ are typically equal to PWM. By compensating for the turn-on and turn-off delays of the DC-DC converter 128, however, gate drive signals $PWM_3$ and $PWM_6$ can be adjusted to achieve SRC of the DC-DC converter 128. Gate drive signals $PWM_4$ and $PWM_6$ could be similarly adjusted based on the turn-on and turn-off delays.

Referring now to FIG. 3, a functional block diagram of the controller 104 is shown. While the controller 104 is illustrated as being separate from the DC-DC converter 128, it should be appreciated that the aspects of the controller 104 for implementing the techniques of the present disclosure could be implemented as part of the DC-DC converter 128 or as part of another controller. The controller 104 can include a communication device 300, a processor 304, and a memory 308. The controller 104 can also communicate (via the communication device 300) with two voltage sensors 320a and 320b (collectively referred to as "voltage sensors 320") and two current sensors 330a and 330b (collectively referred to as "current sensors 330"), which are associated with the DC-DC converter 128. While the voltage sensors 320 and the current sensors 330 are illustrated as being standalone, it should be appreciated that one or more of these sensors could be implemented as part of the controller 104 or the DC-DC converter 128.

Voltage sensor 320a can be configured to measure an input voltage ($V_{in}$) to the DC-DC converter 128 and voltage sensor 320b can be configured to measure the output voltage $V_{out}$ of the DC-DC converter 128. The input voltage $V_{in}$ may equal the primary voltage $V_{DCP}$ and, in some cases, the output voltage $V_{out}$ may equal the secondary voltage $V_{DCS}$. Similarly, current sensor 330a can be configured to measure an input current to the DC-DC converter 128 (hereinafter "$I_{in}$") and current sensor 330b can be configured to measure an output current of the DC-DC converter 128 (hereinafter "$I_{out}$"). It should be appreciated, however, that the input/output voltages and/or currents of the DC-DC converter 128 can be obtained in other ways, such as by modeling or estimation using other parameters.

The communication device 300 can include any suitable components for communication, e.g., via a controller area network (CAN) of the EV 100, with the various illustrated components: the driver interface 112, the primary battery system 124, the DC-DC converter 128, the secondary battery system 132, the low-voltage components 140, the voltage sensors 320, and/or the current sensors 330. For example, the communication device 300 can include an analog-to-digital converter (ADC) 340 configured for communication between the processor 304 and the various analog devices. In particular, the communication device 300 can receive measurements of the input/output voltages and currents of the DC-DC converter 128 from the voltage sensors 320 and the current sensors 330, respectively. The communication device 500 can also receive information indicative of electrical loads (the driver interface 112, the low-voltage components 140, etc.) and/or parameters of at least one of the primary battery system 124 and the secondary battery system 132, e.g., state(s) of charge (SOC).

The processor 304 can control operation of the controller 104. The processor 304 can perform functions including, but not limited to loading/executing an operating system of the controller 104, receiving information from and/or transmitting information to other components via the communication device 300, and/or controlling read/write operations at the memory 308. The memory 308 can be any suitable storage medium configured to store information at the controller 104 (flash, hard disk, etc.). It should be appreciated that the term "processor" as used herein can refer to both a single processor and two or more processors operating in a parallel or distributed architecture. Specifically, the processor 304 can implement all or a portion of the TATSRC techniques of the present disclosure, which are described in more detail below.

The processor 304 can determine a required output current ($I_{oreq}$) for the DC-DC converter 128. The required output current $I_{oreq}$ can represent a desired value of the output current $I_{out}$ for the DC-DC converter 128. The required output current $I_{oreq}$ can be determined based on the secondary voltage $V_{DCS}$ of the secondary battery system 128. The secondary voltage $V_{DCS}$ can be obtained from a measurement received via the communication device 300. For example, if the secondary voltage $V_{DCS}$ of the secondary battery system 132 decreases, a higher required output current $I_{oreq}$ may be requested from the DC-DC converter 128 to recharge the secondary battery system 132. The required output current $I_{oreq}$ can be obtained from a look-up table, e.g., stored at the memory 308, or via another suitable modeling or estimation technique.

After determining the required output current $I_{oreq}$, the processor 304 can determine a switching frequency ($f_s$) for the DC-DC converter 128. The switching frequency $f_s$ can represent a switching frequency for the DC-DC converter 128 that causes the DC-DC converter 128 to output the required output current $I_{oreq}$. The switching frequency $f_s$ can be determined based on the required output current $I_{oreq}$. For example, the switching frequency $f_s$ can correspond to a frequency of the PWM gate control signals $PWM_1$-$PWM_6$ (see FIG. 2A).

The processor 304 can then determine the turn-on delay $t_{on}$ and the turn-off delay $t_{off}$ for the DC-DC converter 128. The turn-on delay $t_{on}$ and the turn-off delay $t_{off}$ can both be determined based on the required output current $I_{oreq}$ and the switching frequency $f_s$. In some implementations, one or more look-up tables, e.g., stored at the memory 308, can be used to determine the turn-on delay $t_{on}$ and the turn-off delay $t_{off}$ based on the required output current $I_{oreq}$ and the switching frequency $f_s$. Two distinct look-up tables can be used to determine the turn-on delay $t_{on}$ and the turn-off delay $t_{off}$, respectively. For example, the look-up tables may be three-dimensional (3D) look-up tables relating delay to current and frequency. The look-up tables can be generated using test data for a specific application, i.e., a specific EV.

After determining the turn-on delay $t_{on}$ and the turn-off delay $t_{off}$ of the DC-DC converter 128, the processor 304 can then control the DC-DC converter 128 based on the turn-on delay $t_{on}$ and the turn-off delay $t_{off}$. Controlling the DC-DC converter 128 can refer to compensating the PWM gate drive signals for the turn-on delay $t_{on}$ and the turn-off delay $t_{off}$. For example only, the PWM gate drive signals can be shifted such that the output current $I_{out}$ begins to rise at time $t_0$ (see FIG. 2B). The processor 304 can then either transmit adjusted PWM gate drive signals to the DC-DC converter 128 via the communication device 300 or the processor 304 can notify a gate driver (not shown) via the communication device 300 to adjust the PWM gate drive signals for the DC-DC converter 128. It should be appreciated that the processor 304 can control the DC-DC converter 128 in other suitable manners based on the turn-on delay $t_{on}$ and the turn-off delay $t_{off}$.

In some implementations, the turn-on delay $t_{on}$ and/or the turn-off delay $t_{off}$ of the DC-DC converter 128 can be adjusted to increase or maximize an efficiency (η) of the DC-DC converter 128. The efficiency of the DC-DC converter 128 can be calculated as follows:

$$\eta = \frac{V_{out} \times I_{out}}{V_{in} \times I_{in}},$$

where $V_{out}$ and $I_{out}$ represent the output voltage and current of the DC-DC converter 128, respectively, and where $V_{in}$ and $I_{in}$ represent the input voltage and current of the DC-DC converter 128, respectively. The processor 304 can obtain the input voltage $V_{in}$ and the output voltage $V_{out}$ from the voltage sensors 320 via the communication device 300. Similarly, the processor 304 can obtain the input current $I_{in}$ and the output current $I_{out}$ from the current sensors 330 via the communication device 300. The processor 304 can then calculate the efficiency η based on these parameters using the equation above or another suitable calculation of DC-DC converter efficiency.

After determining the efficiency η, the processor 304 can compare the efficiency η to a predetermined threshold ($\eta_{th}$). The predetermined threshold $\eta_{th}$ can be indicative of a desired efficiency of the DC-DC converter 128. For example, the predetermined threshold $\eta_{th}$ may be stored at the memory 308. The predetermined threshold $\eta_{th}$ could vary based on the specific application and/or a plurality of different thresholds could be used depending on operating conditions. For purposes of this disclosure, the predetermined threshold $\eta_{th}$ is described as a maximum efficiency ($\eta_{max}$) of the DC-DC converter 128, but it should be appreciated that the predetermined threshold $\eta_{th}$ can indicate a target efficiency less than the maximum efficiency $\eta_{max}$. Specifically, the processor 304 can determine whether the efficiency q is at the maximum efficiency $\eta_{max}$. If true, no adjustments to the turn-on delay $t_{on}$ and the turn-off delay $t_{off}$ are required.

Conversely, if the efficiency n is less than the maximum efficiency $\eta_{max}$, the processor 304 can adjust at least one of the turn-on delay $t_{on}$ and the turn-off delay $t_{off}$. The turn-on delay $t_{on}$ may not change much over varying operating conditions, so in some cases only the turn-off delay $t_{off}$ could be adjusted. Further, the turn-on delay $t_{on}$ could be calculated once and then saved, e.g., at the memory, thereby decreasing computational requirements and/or increasing processing speed. After adjusting the turn-on delay $t_{on}$ and/or the turn-off delay $t_{off}$, the processor 304 can again determine the efficiency η based on new measurements of the input current $I_{in}$, the output current $I_{out}$, the input voltage $V_{in}$, and the output voltage $V_{out}$. If the efficiency η is at the maximum efficiency $\eta_{max}$ after this adjustment, no more adjustment is required. Otherwise, the process can be repeated until the efficiency is at the maximum efficiency $\eta_{max}$.

Figure 4:
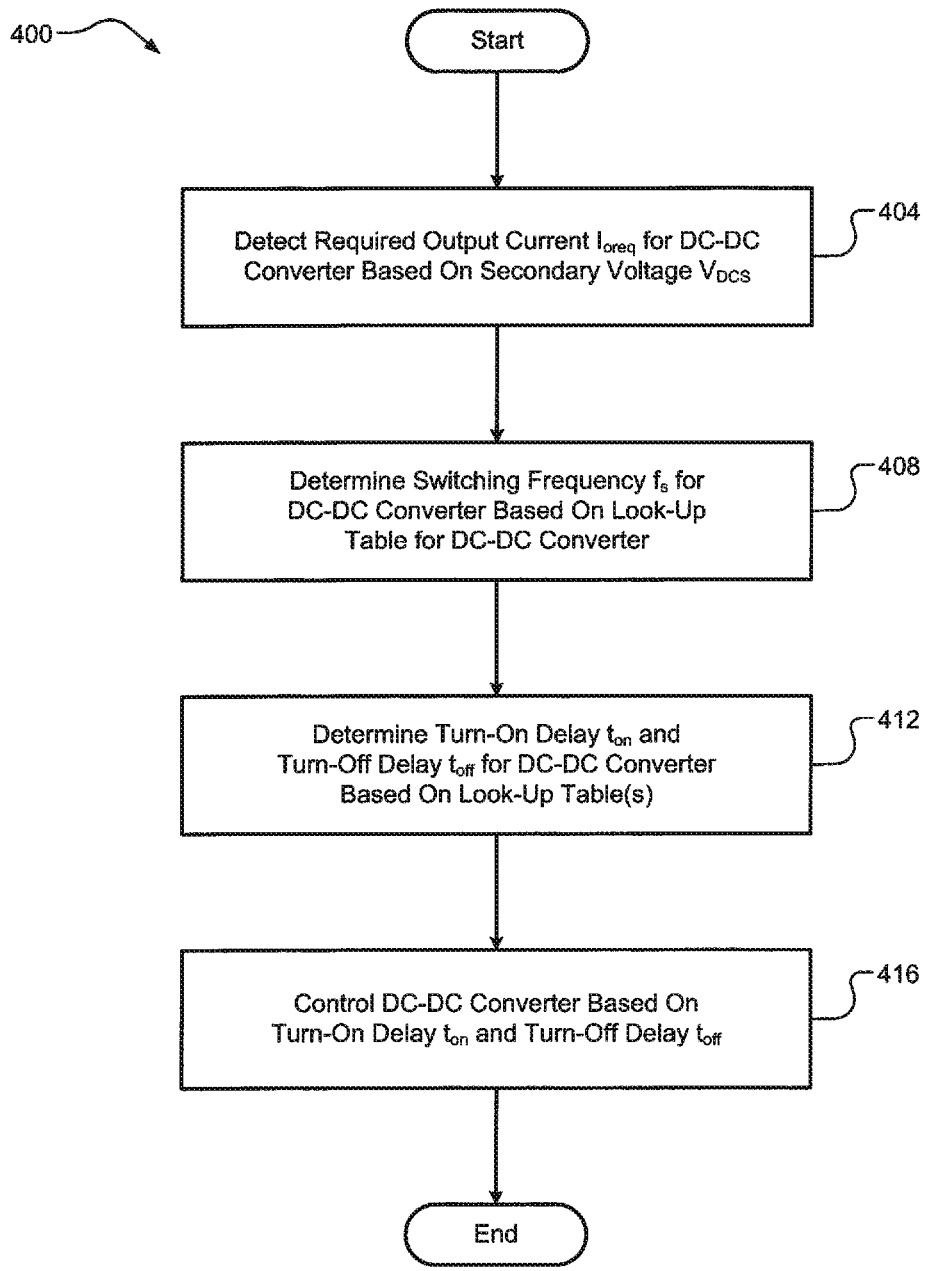
FIG. 4 is a flow diagram of a method of synchronous rectification control (SRC) of DC-DC converters in EVs according to the principles of the present disclosure.

Referring now to FIG. 4, a flow diagram of a method 400 for SRC of DC-DC converters in EVs is illustrated. At 404, the controller 104 can determine the required output current $I_{oreq}$ for the DC-DC converter 128 based on the secondary voltage $V_{DCS}$ of the secondary battery system 132 of the EV 100. At 408, the controller 104 can determine the switching frequency $f_s$ for the DC-DC converter 128 that causes the DC-DC converter 128 to output the required output current $I_{oreq}$. At 412, the controller 104 can determine the turn-on delay $t_{on}$ and the turn-off delay $t_{off}$ of the DC-DC converter 128 based on the required output current $I_{oreq}$ and the switching frequency $f_s$ using one or more look-up tables. At 416, the controller 104 can control the DC-DC converter 128 based on the turn-on delay $t_{on}$ and the turn-off delay $t_{off}$. The method 400 can then end or return to 404 for one or more additional cycles.

Figure 5:
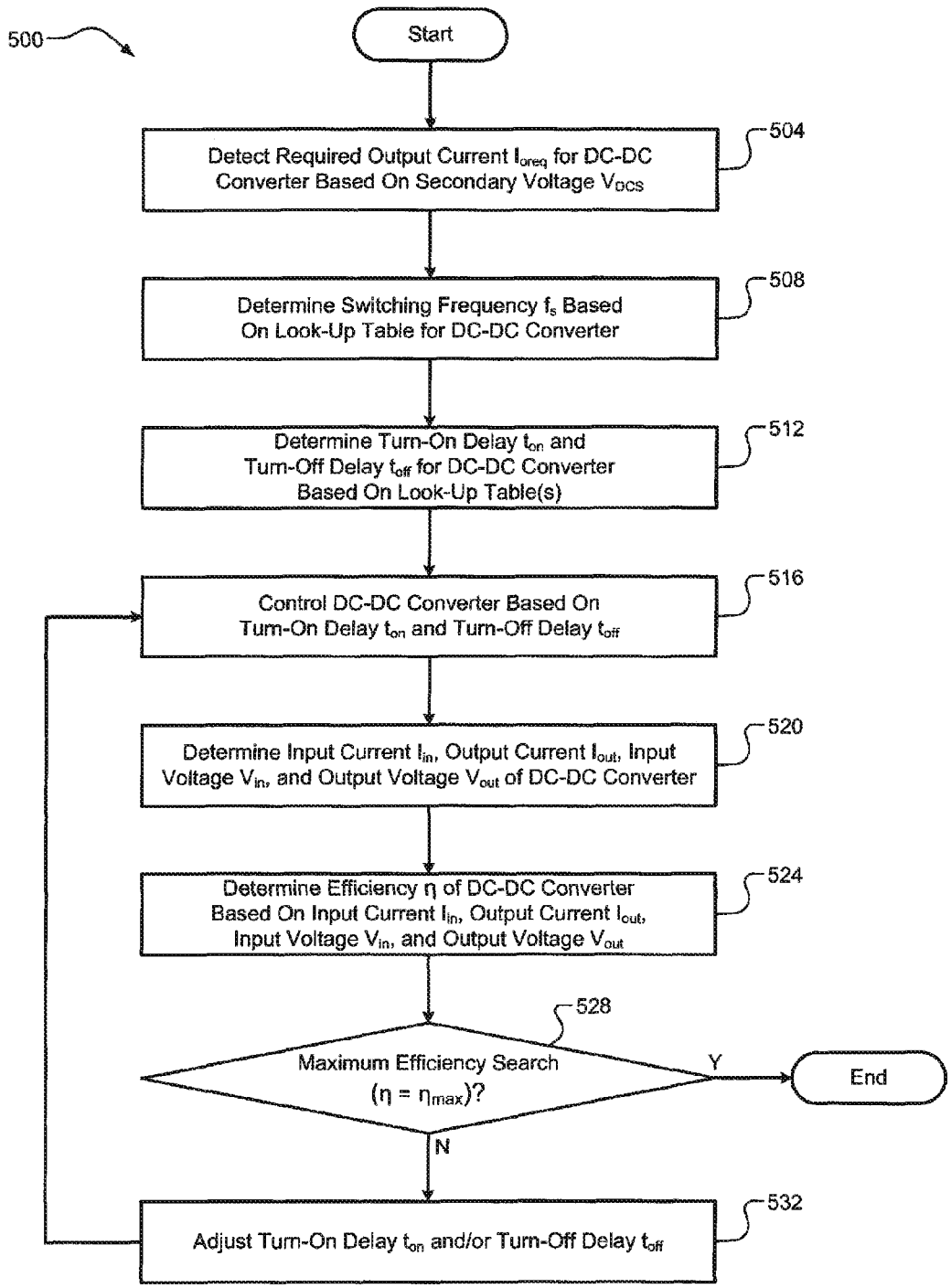
FIG. 5 is a flow diagram of another method of SRC of DC-DC converters in EVs according to the principles of the present disclosure.

Referring now to FIG. 5, a flow diagram of a method 500 for SRC of DC-DC converters in EVs is illustrated. At 504, the controller 104 can determine the required output current $I_{oreq}$ for the DC-DC converter 128 based on the secondary voltage $V_{DCS}$ of the secondary battery system 132 of the EV 100. At 508, the controller 104 can determine the switching frequency $f_s$ for the DC-DC converter 128 that causes the DC-DC converter 128 to output the required output current $I_{oreq}$. At 512, the controller 104 can determine the turn-on delay $t_{on}$ and the turn-off delay $t_{off}$ of the DC-DC converter 128 based on the required output current $I_{oreq}$ and the switching frequency $f_s$ using one or more look-up tables. At 516, the controller 104 can control the DC-DC converter 128 based on the turn-on delay $t_{on}$ and the turn-off delay $t_{off}$.

At 520, the controller 104 can determine the input current $I_{in}$, the output current $I_{out}$, the input voltage $V_{in}$, and the output voltage $V_{out}$ of the DC-DC converter 128. At 524, the controller 104 can determine the efficiency η of the DC-DC converter 128 based on the input current $I_{in}$, the output current $I_{out}$, the input voltage $V_{in}$, and the output voltage $V_{out}$ of the DC-DC converter 128. At 528, the controller 104 can compare the efficiency η of the DC-DC converter 128 to the maximum efficiency $\eta_{max}$ of the DC-DC converter 128. If the efficiency η is at the maximum efficiency $\eta_{max}$, the method 500 can end or return to 504 for one or more additional cycles. Otherwise, the method 500 can proceed to 532. At 532, the controller 104 can adjust at least one of the turn-on delay $t_{on}$ and the turn-off delay $t_{off}$ based on the comparison and the method 500 can return to 516.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:
1. A method, comprising:
  determining, at a controller of an electrified vehicle (EV), the controller including one or more processors, a required output current for a DC-DC converter based on a secondary voltage of a secondary battery system of the EV, the DC-DC converter being configured to convert a primary voltage from a primary battery system of the EV to the secondary voltage;

determining, at the controller, a switching frequency for the DC-DC converter that causes the DC-DC converter to output the required output current;

determining, at the controller, turn-on and turn-off delays of the DC-DC converter based on the required output current and the switching frequency using one or more look-up tables; and controlling, by the controller, the DC-DC converter based on the turn-on and turn-off delays.

2. The method of claim 1, further comprising determining, at the controller, an input current, an output current, an input voltage, and an output voltage of the DC-DC converter in response to controlling the DC-DC converter based on the turn-on and turn-off delays.

3. The method of claim 2, further comprising calculating, at the controller, an efficiency of the DC-DC converter based on the input current, the output current, the input voltage, and the output voltage of the DC-DC converter.

4. The method of claim 3, wherein the efficiency of the DC-DC converter is calculated as:

$$\eta = \frac{V_{out} \times I_{out}}{V_{in} \times I_{in}},$$

where $\eta$ represents the efficiency of the DC-DC converter, $V_{out}$ and $I_{out}$ represent the output voltage and the output current, respectively, and $V_{in}$ and $I_{in}$ represent the input voltage and the input current, respectively.

5. The method of claim 3, further comprising comparing, at the controller, the efficiency to a maximum efficiency of the DC-DC converter.

6. The method of claim 5, further comprising selectively adjusting, at the controller, at least one of the turn-on and turn-off delays based on the comparison to obtain at least one of a modified turn-on delay and a modified turn-off delay.

7. The method of claim 6, wherein selectively adjusting at least one of the turn-on and turn-off delays based on the comparison includes:

adjusting, at the controller, at least one of the turn-on and turn-off delays when the efficiency is less than the maximum efficiency to obtain the at least one of the modified turn-on delay and the modified turn-off delay; and adjusting, at the controller, neither of the turn-on and turn-off delays when the efficiency is at the maximum efficiency.

8. The method of claim 7, further comprising controlling, by the controller, the DC-DC converter based on the at least one of the modified turn-on delay and the modified turn-off delay.

9. The method of claim 6, further comprising storing, at the controller, the turn-on delay, wherein selectively adjusting at least one of the turn-on and turn-off delays based on the comparison includes selectively adjusting the turn-off delay based on the comparison to obtain the modified turn-off delay.

10. The method of claim 8, wherein selectively adjusting the turn-off delay based on the comparison includes:

adjusting, at the controller, the turn-off delay when the efficiency is less than the maximum efficiency to obtain the modified turn-off delay; and not adjusting, at the controller, the turn-off delay when the efficiency is at the maximum efficiency.

11. The method of claim 10, further comprising controlling, by the controller, the DC-DC converter based on the turn on-delay and the modified turn-off delay.

12. The method of claim 1, wherein the turn-on delay is determined using a first look-up table relating delay to current and frequency, and wherein the turn-off delay is determined using a second look-up table relating delay to current and frequency.

13. The method of claim 1, wherein the DC-DC converter is a inductor-inductor-capacitor (LLC) half-bridge DC-DC converter including a plurality of transistors controlled by pulse-width modulated (PWM) control signals.

14. The method of claim 1, wherein the primary battery system is a battery pack including a plurality of lithium-ion battery cells, and wherein the primary voltage is within a range from 220 volts to 400 volts.

15. The method of claim 1, wherein the secondary battery system is a lead-acid battery, and wherein the secondary voltage is within a range from 6.5 volts to 16 volts.

16. A method, comprising:

determining, at a controller of an electrified vehicle (EV), the controller including one or more processors, a required output current for a DC-DC converter based on a secondary voltage of a secondary battery system of the EV, the DC-DC converter being configured to convert a primary voltage from a primary battery system of the EV to the secondary voltage for at least one of recharging the secondary battery system of the EV and powering low-voltage components of the EV;

determining, at the controller, a switching frequency for the DC-DC converter that causes the DC-DC converter to output the required output current;

determining, at the controller, turn-on and turn-off delays of the DC-DC converter based on the required output current and the switching frequency using one or more look-up tables;

controlling, by the controller, the DC-DC converter based on the turn-on and turn-off delays;

determining, at the controller, input current, output current, input voltage, and output voltage of the DC-DC converter;

determining, at the controller, an efficiency of the DC-DC converter based on the input current, the output current, the input voltage, and the output voltage of the DC-DC converter;

comparing, at the controller, the efficiency of the DC-DC converter to a maximum efficiency of the DC-DC converter; and selectively adjusting, at the controller, at least one of the turn-on and turn-off delays of the DC-DC converter based on the comparison to obtain at least one of a modified turn-on delay and a modified turn-off delay.

17. The method of claim 16, further comprising controlling, by the controller, the DC-DC converter based on the at least one of the modified turn-on delay and the modified turn-off delay.

18. The method of claim 16, wherein the efficiency of the DC-DC converter is calculated as:

$$\eta = \frac{V_{out} \times I_{out}}{V_{in} \times I_{in}},$$

where $\eta$ represents the efficiency of the DC-DC converter, $V_{out}$ and $I_{out}$ represent the output voltage and the output current, respectively, and $V_{in}$ and $I_{in}$ represent the input voltage and the input current, respectively.

19. The method of claim 16, further comprising storing, at the controller, the turn-on delay,
wherein selectively adjusting at least one of the turn-on and turn-off delays based on the comparison includes selectively adjusting the turn-off delay based on the comparison to obtain the modified turn-off delay, and
wherein selectively adjusting the turn-off delay based on the comparison to obtain the modified turn-off delay includes:
adjusting, at the controller, the turn-off delay when the efficiency is less than the maximum efficiency to obtain the modified turn-off delay; and
not adjusting, at the controller, the turn-off delay when the efficiency is at the maximum efficiency.

20. The method of claim 16, wherein the turn-on delay is determined using a first look-up table relating delay to current and frequency, and wherein the turn-off delay is determined using a second look-up table relating delay to current and frequency.

* * * * *